United States Patent
Song et al.

(10) Patent No.: US 8,437,516 B2
(45) Date of Patent: May 7, 2013

(54) FACIAL EXPRESSION RECOGNITION APPARATUS AND FACIAL EXPRESSION RECOGNITION METHOD THEREOF

(75) Inventors: Kai-Tai Song, Hsinchu (TW); Meng-Ju Han, Taipei County (TW); Shih-Chieh Wang, Taipei (TW); Chia-Ho Lin, Zhubei (TW); Chi-Yi Lin, Pingtung (TW)

(73) Assignee: Novatek Microelectronics Corp., Hsinchu (TW)

( * ) Notice: Subject to any disclaimer, the term of this patent is extended or adjusted under 35 U.S.C. 154(b) by 745 days.

(21) Appl. No.: 12/618,961

(22) Filed: Nov. 16, 2009

(65) Prior Publication Data

US 2010/0278385 A1  Nov. 4, 2010

(30) Foreign Application Priority Data

Apr. 30, 2009 (TW) ............................. 98114480 A

(51) Int. Cl.
*G06K 9/00* (2006.01)
(52) U.S. Cl.
USPC .......................................................... 382/118
(58) Field of Classification Search .................... 382/118
See application file for complete search history.

(56) References Cited

U.S. PATENT DOCUMENTS

| 6,011,635 | A * | 1/2000 | Bungo et al. .................. 358/488 |
| 6,430,307 | B1 | 8/2002 | Souma et al. |
| 6,526,161 | B1 | 2/2003 | Yan |
| 7,120,279 | B2 * | 10/2006 | Chen et al. ..................... 382/118 |
| 7,379,568 | B2 | 5/2008 | Movellan et al. |
| 7,447,907 | B2 * | 11/2008 | Hart et al. ...................... 713/176 |
| 8,144,255 | B2 * | 3/2012 | Hirayama et al. ............. 348/701 |
| 2002/0150280 | A1 * | 10/2002 | Li .................................... 382/117 |
| 2003/0053685 | A1 * | 3/2003 | Lestideau ....................... 382/164 |
| 2003/0174869 | A1 * | 9/2003 | Suarez ............................. 382/118 |
| 2005/0105827 | A1 * | 5/2005 | Yonaha et al. .................. 382/291 |
| 2007/0071288 | A1 * | 3/2007 | Wu et al. ........................ 382/118 |
| 2007/0189584 | A1 | 8/2007 | Li |
| 2009/0285456 | A1 * | 11/2009 | Moon et al. .................... 382/118 |
| 2010/0259676 | A1 * | 10/2010 | Swan ............................. 348/468 |

FOREIGN PATENT DOCUMENTS

| TW | 0445434 | 7/2001 |
| TW | 226589 B | 1/2005 |

OTHER PUBLICATIONS

Wang Jian et al, "MSSFD-an Algorithm of Step-by-Step Face Detection", College of Computer Science, China University of Mining and Technology, Xuzhou 221008, China.

* cited by examiner

*Primary Examiner* — Tom Y Lu
(74) *Attorney, Agent, or Firm* — Rabin & Berdo, P.C.

(57) ABSTRACT

A facial expression recognition apparatus and a facial expression recognition method thereof are provided. The facial expression recognition apparatus comprises a gray image generating unit, a face edge detection unit, a motion skin extraction unit, a face contour generating unit and a facial expression recognition unit. The gray image generating unit generates a gray image according to an original image. The face edge detection unit outputs a face edge detection result according to the gray image. The motion skin extraction unit generates a motion skin extraction result according to the original image, and generates a face and background division result according to the motion skin extraction result. The face contour generating unit outputs a face contour according to the gray image, the face edge detection result and the face and background division result. The facial expression recognition unit outputs a facial expression recognition result according to the face contour.

16 Claims, 4 Drawing Sheets

FACIAL EXPRESSION RECOGNITION APPARATUS AND FACIAL EXPRESSION RECOGNITION METHOD THEREOF

This application claims the benefit of Taiwan application Serial No. 98114480, filed Apr. 30, 2009, the subject matter of which is incorporated herein by reference.

BACKGROUND OF THE INVENTION

1. Field of the Invention

The invention relates in general to a facial expression recognition apparatus and a facial expression recognition method thereof, and more particularly to a facial expression recognition apparatus having the low operation loading, and a facial expression recognition method thereof.

2. Description of the Related Art

In the life, people often express the inward emotion through the facial expression. The emotion expressing region mainly includes the mouth, the eyes, the eyebrows, the jowls and the like. When a person is expressing his inward emotion, only the local feature on the face is changed (e.g., the corners of the mouth are turned up) such that the emotion can be expressed. In the technology changing with each passing day, people further hope to apply the facial expression recognition to the electronic device to significantly enhance the convenience of application.

The smiling face detection is one of the important items of the facial expression detection, and its processing methods may be divided into the face feature detection technology and the classifier technology. In the conventional face feature detection technology, fixed frames corresponding to the eyes, the nose and the mouth are often set on the face region, and then the face feature positions are calculated by way of statistical comparison, as disclosed in Taiwan Patent Nos. 00445434; TW226589B and U.S. Pat. No. 6,526,161. In addition, regarding the classifier technology, U.S. Pat. No. 6,430,307 disclosed a feature extraction system and a face image recognition system, in which the original samples and the newly added samples are put into the PCA so that the orthonormal base is calculated, and then the comparison is made to determine whether a match occurs or not.

However, the conventional facial expression detection technology has the great operation loading, and cannot be easily used in an embedded platform (e.g., a digital camera). In addition, the conventional facial expression detection technology tends to be influenced by the light source. When the brightness is nonuniform, the correctness of the facial expression recognition result is directly influenced.

SUMMARY OF THE INVENTION

The invention is directed to a facial expression recognition apparatus and a facial expression recognition method thereof. The invention includes the following advantages.

First, the feature positions still can be extracted when the face has the posture change.

Second, the influence induced by the light source variation may be reduced.

Third, the face feature positions may be calculated quickly.

Fourth, the facial expression recognition result may be quickly obtained.

Fifth, the operation loading is low, and the invention is very suitable for the embedded system.

According to a first aspect of the present invention, a facial expression recognition apparatus is provided. The facial expression recognition apparatus includes a gray image generating unit, a face edge detection unit, a motion skin extraction unit, a face contour generating unit and a facial expression recognition unit. The gray image generating unit generates a gray image according to an original image. The face edge detection unit outputs a face edge detection result according to the gray image. The motion skin extraction unit generates a motion skin extraction result according to the original image, and generates a face and background division result according to the motion skin extraction result. The face contour generating unit outputs a face contour according to the gray image, the face edge detection result and the face and background division result. The facial expression recognition unit outputs a facial expression recognition result according to the face contour.

According to a second aspect of the present invention, a facial expression recognition method is provided. The facial expression recognition method includes the steps of: generating a gray image according to an original image; outputting a face edge detection result according to the gray image; generating a motion skin extraction result according to the original image and generating a face and background division result according to the motion skin extraction result; outputting a face contour according to the gray image, the face edge detection result and the face and background division result; and outputting a facial expression recognition result according to the face contour.

The invention will become apparent from the following detailed description of the preferred but non-limiting embodiments. The following description is made with reference to the accompanying drawings.

DETAILED DESCRIPTION OF THE INVENTION

In the following embodiment, a facial expression recognition apparatus and its facial expression recognition method are provided. The facial expression recognition apparatus includes a gray image generating unit, a face edge detection unit, a motion skin extraction unit, a face contour generating unit and a facial expression recognition unit. The gray image generating unit generates a gray image according to an original image. The face edge detection unit outputs a face edge detection result according to the gray image. The motion skin extraction unit generates a motion skin extraction result according to the original image and generates a face and background division result according to the motion skin extraction result. The face contour generating unit outputs a face contour according to the gray image, the face edge detection result and the face and background division result. The facial expression recognition unit outputs a facial expression recognition result according to the face contour. The embodiment will be described in the following.

Figure 1:
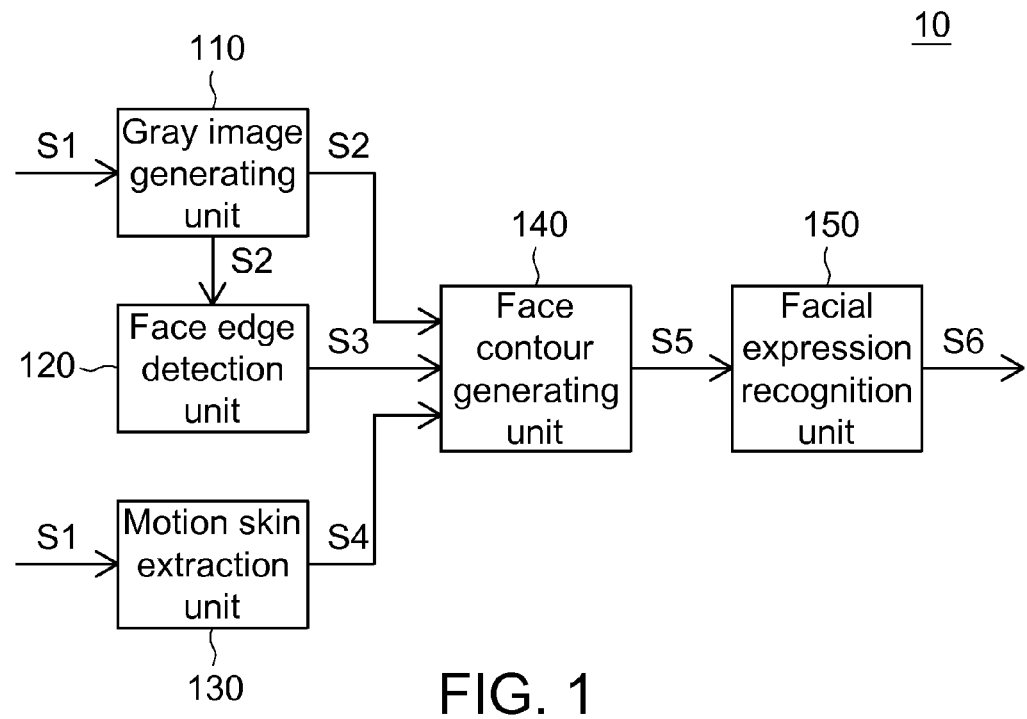
FIG. 1 is a schematic illustration showing a facial expression recognition apparatus according to an embodiment of the invention.

FIG. 1 is a schematic illustration showing a facial expression recognition apparatus 10 according to an embodiment of the invention. Referring to FIG. 1, the facial expression recognition apparatus 10 includes a gray image generating unit 110, a face edge detection unit 120, a motion skin extraction unit 130, a face contour generating unit 140 and a facial expression recognition unit 150. The gray image generating unit 110 generates a gray image S2 according to an original image S1. The face edge detection unit 120 outputs a face edge detection result S3 according to the gray image S2. The face edge detection unit 120 detects, for example, a horizontal edge of the gray image S2 to output the face edge detection result S3. The motion skin extraction unit 130 generates a motion skin extraction result according to the original image S1, and generates a face and background division result S4 according to the motion skin extraction result. The face contour generating unit 140 outputs a face contour S5 according to the gray image S2, the face edge detection result S3 and the face and background division result S4. The facial expression recognition unit 150 outputs a facial expression recognition result S6 according to the face contour S5.

It is to be specified that one image cannot be uniformly distributed over gray values ranging from 0 to 255. Most pixels fall within a certain zone. For example, 80% to 90% of gray values of one face image range from 50 to 100. The so-called motion skin represents the different threshold values are set according to different face images at that time. Because the threshold value is set according to all the gray value ratios of the whole face image, the excellent adaptive property is obtained to decrease the influence caused by the variation of the light source. As a result, it is obtained that the motion skin extraction unit 130 adaptively generates the face and background division result S4 according to the motion skin extraction result so that the influence caused by the variation of the light source may be significantly decreased. In addition, because the facial expression recognition apparatus 10 does not use the fixed frame, the feature positions may also be correctly extracted when the posture of the face changes. Furthermore, the face contour generating unit 140 calculates the face contour S5, which is advantageous to the rapidly subsequent calculation of the face feature positions. Moreover, the facial expression recognition apparatus 10 has the low operation loading, and is thus very suitable for the application of the embedded system.

Figure 2:
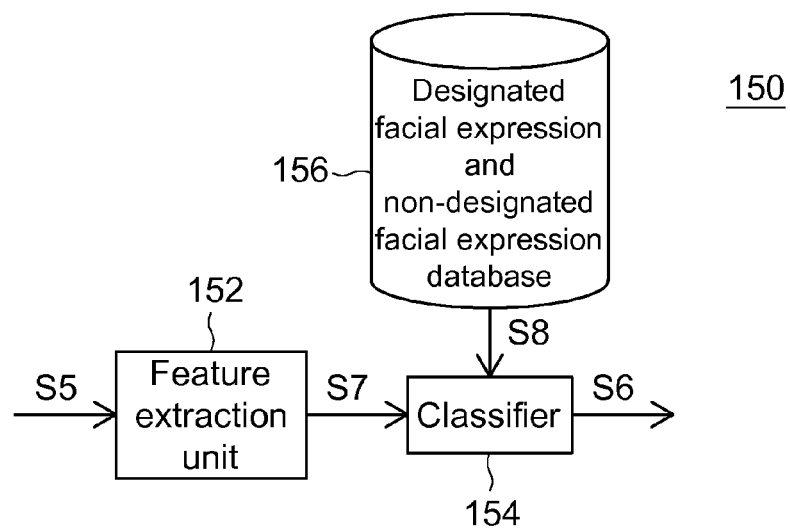
FIG. 2 is a schematic illustration showing a facial expression recognition unit.

FIG. 2 is a schematic illustration showing the facial expression recognition unit 150. Referring to FIG. 2, the facial expression recognition unit 150 further includes a feature extraction unit 152, a designated facial expression and non-designated facial expression database 156 and a classifier 154. The feature extraction unit 152 outputs a feature vector S7 according to the face contour S5. The designated facial expression and non-designated facial expression database 156 stores multiple designated facial expression images and multiple non-designated facial expression images, and outputs a feature vector S8 according to the designated facial expression images and the non-designated facial expression images. The classifier 154 outputs the facial expression recognition result S6 according to the feature vector S7 and the feature vector S8.

The classifier 154 is, for example, a classifier of a support vector machine (SVM). The images stored in the designated facial expression and non-designated facial expression database 156 may be classified into the designated facial expression images and the non-designated facial expression images. Support vectors (SVs) may be obtained through the training of the support vector machine, and separating hyper planes between two kinds of data may be obtained so that the distances from the two kinds of data to the separating hyper planes reach the maximum.

The classifier 154 determines whether the facial expression recognition result S6 pertains to the designated facial expression image or the non-designated facial expression image according to an inner product result of the feature vector S7 and the feature vector S8, for example. For example, when the inner product result of the feature vector S7 and the feature vector S8 is greater than 0, it represents that the facial expression recognition result S6 pertains to the designated facial expression image. Oppositely, when the inner product result of the feature vector S7 and the feature vector S8 is smaller than 0, it represents that the facial expression recognition result S6 pertains to the non-designated facial expression image.

Figure 3:
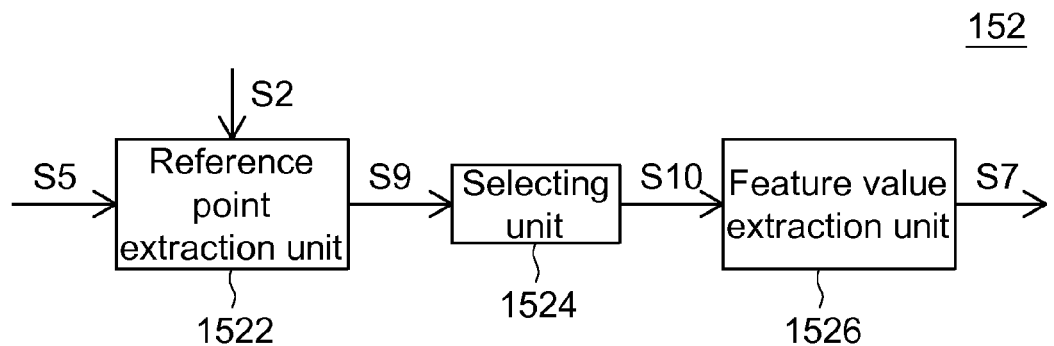
FIG. 3 is a schematic illustration showing a feature extraction unit.
Figure 4:
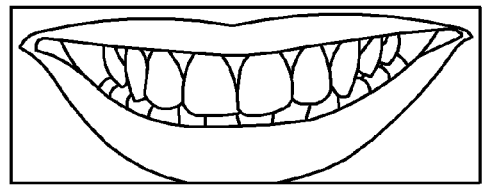
FIG. 4 is a schematic illustration showing a mouth region.
Figure 5:
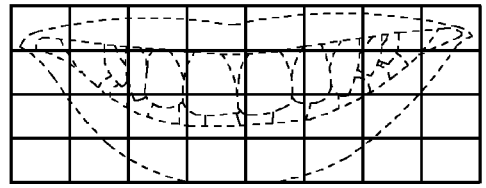
FIG. 5 is a schematic illustration showing that the mouth region is divided into 32 equal portions.

FIG. 3 is a schematic illustration showing a feature extraction unit. FIG. 4 is a schematic illustration showing a mouth region. FIG. 5 is a schematic illustration showing that the mouth region is divided into 32 equal portions. Referring to FIGS. 3 to 5, the feature extraction unit 152 further includes a reference point extraction unit 1522, a selecting unit 1524 and a feature value extraction unit 1526. The reference point extraction unit 1522 outputs feature point data S9 according to the face contour S5 and the gray image S2. The feature point data S9 may be a reference point of any facial feature, such as an eye reference point and a mouth reference point. The selecting unit 1524 selects a feature region S10 according to the feature point data S9. The feature region S10 may be a region of any one of the facial features, such as the mouth region and the eye region. The feature value extraction unit 1526 divides the feature region S10 into several equal portions, and calculates an average of each of the equal portions to output the feature vector S7. For example, the feature region S10 is the mouth region depicted in FIG. 4. The feature value extraction unit 1526 divides the mouth region into 4×8 equal portions, and calculates an average of gray values of each of the equal portions. In practice, the upper left grid, the lower left grid, the upper right grid and the lower right grid of the mouth region usually exceed the range of the lip. Thus, the four values are omitted, and the average of the remaining 28 gray values is calculated as the feature vector S7 representing the mouth region to train the classifier 154 of FIG. 2. Because the gray values of the feature region S10 may be regarded as one set of feature vectors, the classifier 154 of FIG. 2 may rapidly obtain the facial expression recognition result S6.

Figure 6:
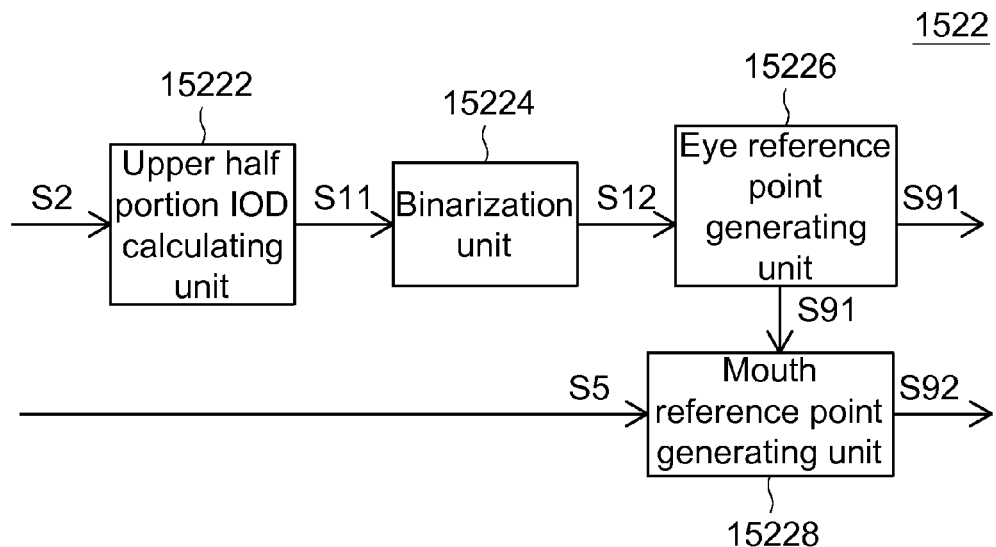
FIG. 6 is a schematic illustration showing a reference point extraction unit.

FIG. 6 is a schematic illustration showing a reference point extraction unit. Referring to FIG. 6, the reference point extraction unit 1522 further includes an upper half portion integrated optical density (IOD) calculating unit 15222, a binarization unit 15224, an eye reference point generating unit 15226 and a mouth reference point generating unit 15228. The upper half portion IOD calculating unit 15222 calculates an upper half portion IOD S11 of the upper half portion of the gray image S2. The binarization unit 15224 outputs a binarization result S12 according to the upper half portion IOD S11. The eye reference point generating unit 15226 finds two eye reference points S91 of the feature point data S9 according to the binarization result S12. The mouth reference point generating unit 15228 finds a mouth reference point S92 of the feature point data S9 according to the two eye reference points S91 and the face contour S5.

For example, the upper half portion IOD calculating unit 15222 finds 5% of blackest portions of the upper half portion of the gray image S2 according to the upper half portion IOD to obtain the eyebrow positions. The binarization unit 15224 binarizes the upper half portion IOD S11 according to the threshold value. The portion higher than the threshold value in the upper half portion IOD S11 is set as 255, while the portion lower than the threshold value in the upper half portion IOD S11 is set as 0. The two eye reference points S91 include the left-eye reference point and the right-eye reference point. A first breakpoint of the eye reference point generating unit 15226 on the left side of the binarization result S12 from bottom to top is the left-eye reference point. Similarly, a first breakpoint of the eye reference point generating unit 15226 on the right side of the binarization result S12 from bottom to top is the right-eye reference point. The mouth reference point generating unit 15228 calculates the middle point between the left-eye reference point and the right-eye reference point as the horizontal coordinate of the mouth reference point S92, and selects a lowest position of the average brightness of the lower half portion of the face contour S5 as the vertical coordinate of the mouth reference point S92.

Figure 7:
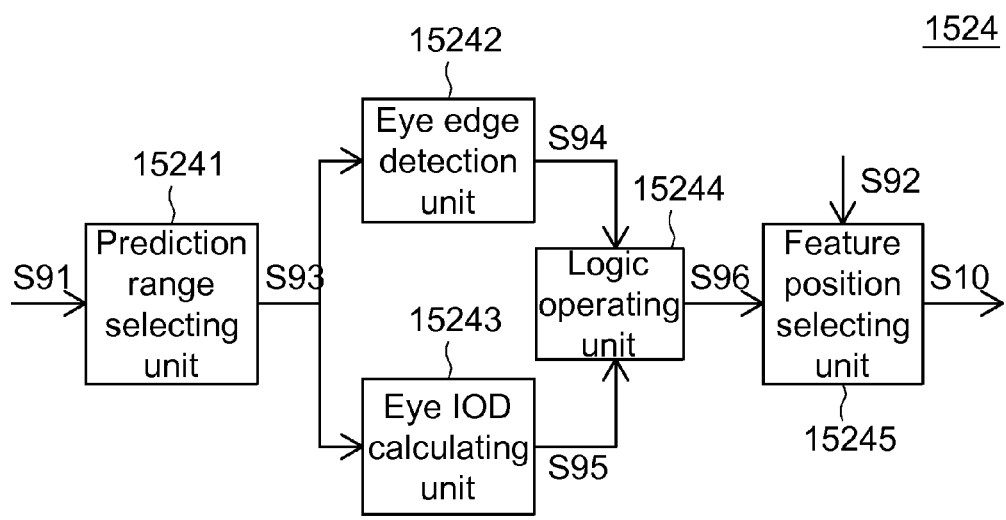
FIG. 7 is a schematic illustration showing a selecting unit.

FIG. 7 is a schematic illustration showing the selecting unit 1524. Referring to FIG. 7, the selecting unit 1524 further includes a prediction range selecting unit 15241, an eye edge detection unit 15242, an eye IOD calculating unit 15243, a logic operating unit 15244 and a feature position selecting unit 15245. The prediction range selecting unit 15241 firstly selects an approximate eye prediction range S93 according to two eye reference points S91. The eye edge detection unit 15242 outputs an eye edge detection result S94 according to the eye prediction range S93. The eye IOD calculating unit 15243 outputs an eye IOD S95 according to the eye prediction range S93. The logic operating unit 15244 outputs a logic operation result S96, such as an intersection of the eye edge detection result S94 and the eye IOD S95, according to the eye edge detection result S94 and the eye IOD S95. The feature position selecting unit 15245 selects the eye region of the feature region S10 according to the logic operation result S96, and selects the mouth region of the feature region S10 according to the mouth reference point S92. After the selecting unit 1524 selects the mouth region, the classifier 154 of FIG. 2 can detect whether the facial expression of the smiling face occurs according to the average of the gray values in the mouth region. Similarly, after the selecting unit 1524 selects the eye region, the classifier 154 of FIG. 2 can detect whether the facial expression of wink occurs according to the average of the gray values in the eye region.

Figure 8:
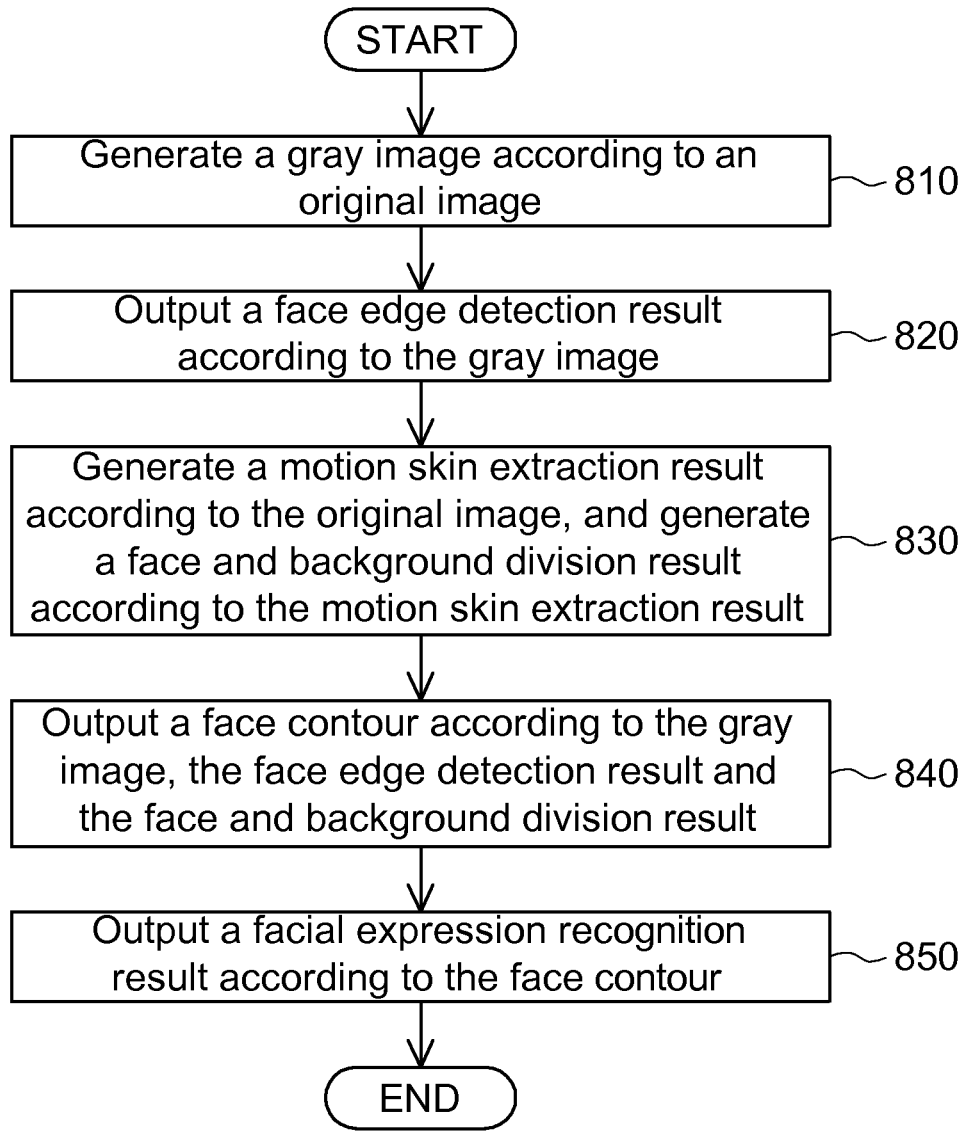
FIG. 8 is a flow chart showing a facial expression recognition method according to the embodiment of the invention.

Please refer to FIGS. 1 and 8 simultaneously. FIG. 8 is a flow chart showing a facial expression recognition method according to the embodiment of the invention. The facial expression recognition method may be applied to the facial expression recognition apparatus 10 according to the embodiment of the invention. The facial expression recognition method includes the following steps. First, as shown in step 810, the gray image generating unit 110 generates the gray image S2 according to the original image S1. Next, as shown in step 820, the face edge detection unit 120 outputs the face edge detection result S3 according to the gray image S2. Then, as shown in step 830, the motion skin extraction unit 130 generates the motion skin extraction result according to the original image S1, and generates the face and background division result S4 according to the motion skin extraction result. Then, as shown in step 840, the face contour generating unit 140 outputs the face contour S5 according to the gray image S2, the face edge detection result S3 and the face and background division result S4. Finally, as shown in step 850, the facial expression recognition unit 150 outputs the facial expression recognition result S6 according to the face contour S5.

The facial expression recognition apparatus and its facial expression recognition method according to the embodiment of the invention have many advantages, some of which will be listed in the following.

First, the feature positions still can be extracted when the face has the posture change.

Second, the influence induced by the light source variation may be reduced.

Third, the face feature positions may be calculated quickly.

Fourth, the facial expression recognition result may be quickly obtained.

Fifth, the operation loading is low, and the invention is very suitable for the embedded system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A facial expression recognition method, comprising:
generating a gray image according to an original image;
outputting a face edge detection result according to the gray image;
generating a motion skin extraction result according to the original image and generating a face and background division result according to the motion skin extraction result;
outputting a face contour according to the gray image, the face edge detection result and the face and background division result; and
outputting a facial expression recognition result according to the face contour;
wherein the step of outputting the facial expression recognition result comprises:
    outputting a first feature vector according to the face contour;
    storing a plurality of designated facial expression images and a plurality of non-designated facial expression images, and outputting at least one second feature vector according to the designated facial expression images and the non-designated facial expression images; and
    outputting the facial expression recognition result according to the first feature vector and the second feature vector; and
wherein the step of outputting the first feature vector comprises:
    outputting feature point data according to the face contour and the gray image;
    selecting a feature region according to the feature point data; and
    dividing the feature region into a plurality of equal portions and calculating an average gray value of each of the equal portions to output the first feature vector.

2. The method according to claim 1, wherein the step of outputting the feature point data comprises:
calculating an upper half portion integrated optical density (IOD) of an upper half portion of the gray image;
outputting a binarization result according to the upper half portion IOD;
finding a first eye reference point and a second eye reference point of the feature point data according to the binarization result; and finding a mouth reference point of the feature point data according to the first eye reference point, the second eye reference point and the face contour.

3. The method according to claim 2, wherein the step of selecting the feature region comprises:
  selecting an eye prediction range according to the first eye reference point and the second eye reference point;
  outputting an eye edge detection result according to the eye prediction range;
  outputting an eye IOD according to the eye prediction range;
  outputting a logic operation result according to the eye edge detection result and the eye IOD;
  selecting an eye region of the feature region according to the logic operation result, and selecting a mouth region of the feature region according to the mouth reference point.

4. The method according to claim 3, wherein the step of outputting the logic operation result outputs an intersection of the eye edge detection result and the eye IOD.

5. The method according to claim 2, wherein the step of finding the mouth reference point of the feature point data comprises:
  calculating a horizontal coordinate of the mouth reference point according to the first eye reference point and the second eye reference point; and
  finding a vertical coordinate of the mouth reference point according to an average brightness of a lower half portion of the face contour.

6. The method according to claim 5, wherein the step of calculating the horizontal coordinate of the mouth reference point calculates a middle point of the first eye reference point and the second eye reference point as the horizontal coordinate of the mouth reference point.

7. The method according to claim 5, wherein the step of finding the vertical coordinate of the mouth reference point selects a lowest position of the average brightness of the lower half portion of the face contour as the vertical coordinate of the mouth reference point.

8. The method according to claim 1, wherein the step of outputting the face edge detection result detects a horizontal edge of the gray image to output the face edge detection result.

9. A facial expression recognition apparatus, comprising:
  a gray image generating unit for generating a gray image according to an original image;
  a face edge detection unit for outputting a face edge detection result according to the gray image;
  a motion skin extraction unit for generating a motion skin extraction result according to the original image, and generating a face and background division result according to the motion skin extraction result;
  a face contour generating unit for outputting a face contour according to the gray image, the face edge detection result and the face and background division result; and
  a facial expression recognition unit for outputting a facial expression recognition result according to the face contour;
  wherein the facial expression recognition unit comprises:
    a feature extraction unit for outputting a first feature vector according to the face contour;
    a designated facial expression and non-designated facial expression database for storing a plurality of designated facial expression images and a plurality of non-designated facial expression images, and outputting at least one second feature vector according to the designated facial expression images and the non-designated facial expression images; and
    a classifier for outputting the facial expression recognition result according to the first feature vector and the second feature vector; and
  wherein the feature extraction unit comprises:
    a reference point extraction unit for outputting feature point data according to the face contour and the gray image;
    a selecting unit for selecting a feature region according to the feature point data; and
    a feature value extraction unit for dividing the feature region into a plurality of equal portions, and calculating an average gray value of each of the equal portions to output the first feature vector.

10. The apparatus according to claim 9, wherein the reference point extraction unit comprises:
  an upper half portion integrated optical density (IOD) calculating unit for calculating an upper half portion IOD of an upper half portion of the gray image;
  a binarization unit for outputting a binarization result according to the upper half portion IOD;
  an eye reference point generating unit for finding a first eye reference point and a second eye reference point of the feature point data according to the binarization result; and
  a mouth reference point generating unit for finding a mouth reference point of the feature point data according to the first eye reference point, the second eye reference point and the face contour.

11. The apparatus according to claim 10, wherein the selecting unit comprises:
  a prediction range selecting unit for selecting an eye prediction range according to the first eye reference point and the second eye reference point;
  an eye edge detection unit for outputting an eye edge detection result according to the eye prediction range;
  an eye integrated optical density (IOD) calculating unit for outputting an eye IOD according to the eye prediction range;
  a logic operating unit for outputting a logic operation result according to the eye edge detection result and the eye IOD; and
  a feature position selecting unit for selecting an eye region of the feature region according to the logic operation result and selecting a mouth region of the feature region according to the mouth reference point.

12. The apparatus according to claim 11, wherein the logic operating unit outputs an intersection of the eye edge detection result and the eye IOD.

13. The apparatus according to claim 10, wherein the mouth reference point generating unit calculates a horizontal coordinate of the mouth reference point according to the first eye reference point and the second eye reference point, and finds a vertical coordinate of the mouth reference point according to an average brightness of a lower half portion of the face contour.

14. The apparatus according to claim 13, wherein the mouth reference point generating unit calculates a middle point of the first eye reference point and the second eye reference point as the horizontal coordinate of the mouth reference point.

15. The apparatus according to claim 13, wherein the mouth reference point generating unit selects a lowest position of the average brightness of the lower half portion of the face contour as the vertical coordinate of the mouth reference point.

16. The apparatus according to claim 9, wherein the face edge detection unit detects a horizontal edge of the gray image to output the face edge detection result.

\* \* \* \* \*